(12) United States Patent
Scoggins et al.

(10) Patent No.: US 6,888,839 B1
(45) Date of Patent: May 3, 2005

(54) METHOD AND APPARATUS FOR TUNNELING OPERATING CODES TO AND FROM A CALL SERVER IN A PACKET NETWORK

(75) Inventors: Shwu-Yan Chang Scoggins, Cary, NC (US); John Schroder, Apex, NC (US); Janelle T. Tucker, Maineville, OH (US)

(73) Assignee: Nortel Networks Limited, St. Laurent (CA)

( * ) Notice: Subject to any disclaimer, the term of this patent is extended or adjusted under 35 U.S.C. 154(b) by 886 days.

(21) Appl. No.: 09/691,991

(22) Filed: Oct. 19, 2000

(51) Int. Cl.⁷ .......................... H04L 12/28; H04L 12/56
(52) U.S. Cl. ........................................ 370/410; 370/352
(58) Field of Search ................................ 370/236, 351, 370/352, 353, 354, 355, 356, 271, 395.52, 395.3, 410, 522, 524; 709/246, 225, 219, 218, 237, 227; 379/229, 221.08, 221.09, 221.1

(56) References Cited

U.S. PATENT DOCUMENTS 6,490,451 B1 * 12/2002 Denman et al. ............ 455/436
6,614,781 B1 * 9/2003 Elliott et al. ................ 370/352
6,680,943 B1 * 1/2004 Gibson et al. .............. 370/392
6,728,239 B1 * 4/2004 Kung et al. ................. 370/352
6,826,173 B1 * 11/2004 Kung et al. ................. 370/352

* cited by examiner

Primary Examiner—Wellington Chin
Assistant Examiner—Jamal A. Fox (57) ABSTRACT

Method and apparatus for tunneling operating codes to and from a call server in a packet network. A signaling package for the Megaco/H.248 protocol is provided which encapsulates or "tunnels" control and signaling codes for an endpoint device so that the codes can be communicated between a call server and the device. Only the call server and the endpoint device need have the intelligence to interpret the operating codes. Where the device is a programmable phone, the call server can be provisioned to understand and control specialized functions of the phone without adding new, telephone specific signaling to the standard Megaco/H.248 protocol for each type of phone to be supported. The media gateway that serves the specific telephone in question simply passes on any operating codes received.

22 Claims, 7 Drawing Sheets

METHOD AND APPARATUS FOR TUNNELING OPERATING CODES TO AND FROM A CALL SERVER IN A PACKET NETWORK

BACKGROUND

1. Field of the Invention

This invention is related to multimedia packet networks. Specifically, this invention relates to a mechanism to allow a call server to control the operation of a programmable phone, which is connected to a media gateway within such a network.

2. Description of the Problem

Evolution of the public switched telephone network (PSTN) has accelerated in recent years; however, most of the PSTN still operates on circuit switched, time division multiplexed (TDM) connections. Integrated services digital network (ISDN) bearer channels often provide transport. In parallel with the PSTN, a packet based data network has evolved. This data network has largely been used for Internet traffic and data networking. Although these networks have been mostly separate until recently, the two networks are starting to merge. The merger of these networks requires that voice traffic be carried over packet networks, and further that such packet networks be able to seamlessly integrate with traditional circuit switched networks, as the two types of networks may carry different call legs of the same call.

Figures 1, 2:
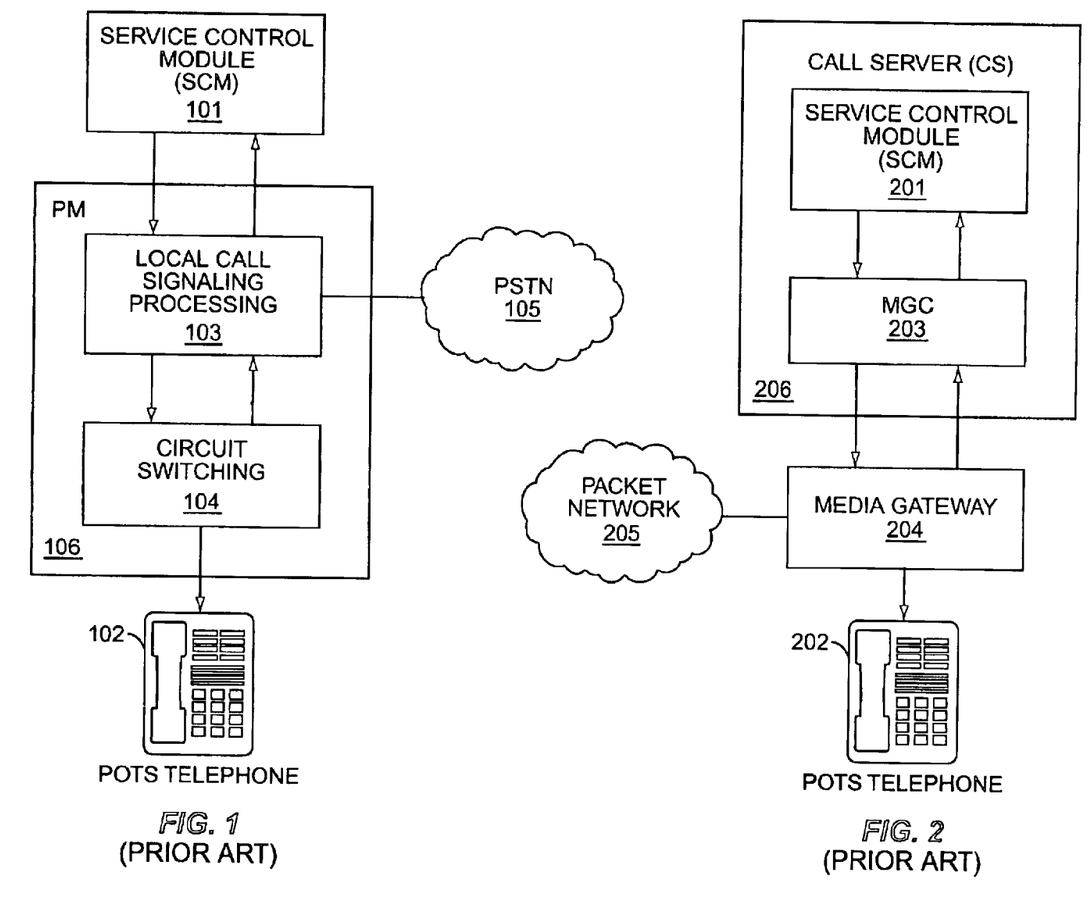
FIG. 1 is a block diagram that illustrates how a POTS telephone is connected to the PSTN in the prior art.
FIG. 2 is a block diagram that illustrates how a POTS telephone is connected to a packet network in the prior art.

FIG. 1 is a block diagram of the hardware that connects a telephone into the PSTN to provide calling functions. A service control module (SCM), 101, controls the function of the switching system of a central office. The central office provides access to the public switched telephone network (PSTN), 105, for a telephone, 102. The telephone in this case is a "plain old telephone system" (POTS) analog phone. Peripheral module (PM) 106 contains a local call signaling processing function, 103, and a circuit switching function, 104, which handle voice and other signals being exchanged with the POTS phone, 102. Calls may pass through multiple toll offices, may be connected directly from one end office to another, or may be switched within the same end office. Signaling between offices is typically provided by an ISUP (ISDN user part) connection through other peripheral modules. ISUP signaling is well understood and is standard in the telecommunications industry. For more information on ISUP signaling, see the various International Telecommunications Union (ITU) Recommendations pertaining to telephone signaling, including Q.761, Q.764 and Q.931, the most recent versions of which at the time of filing this application are incorporated herein by reference.

FIG. 2 is a block diagram of the hardware used to connect a telephone to a packet switched network. In the case of FIG. 2, a telephone or other legacy device or network connected to the media gateway is said to be connected at an "endpoint" of the packet network. The call is transported from one end office to another via a packet switched network 205. In most cases the packet network is an asynchronous transfer mode (ATM) network or an internet protocol (IP) network, but frame relay (FR) or other network types can be used. The fact that the call traverses a packet network is, in theory, transparent to a caller using POTS telephone 202. In order for the packet network to seamlessly connect with devices or equipment at an endpoint, like POTS telephones, designed for the PSTN, one type of media must be converted to another. This conversion is referred to generally as voice packetization. In the ATM case it is also sometimes referred to as circuit emulation services (CES). The device that provides this conversion is called a media gateway (MG), 204 in FIG. 2. In the system of FIG. 2, a media gateway handles each end of a bearer connection through packet network 205. The media gateway and the packet network it serves may be capable of processing audio and video. The media gateway is capable of full duplex media translations. It may also provide other features such as conferencing.

Each media gateway is associated with a media gateway controller (MGC), 203 of FIG. 2. The media gateway is "dumb" in that it does not have call processing capabilities. The call processing capabilities for the network reside in the MGC, 203, and in its SCM, 201. The MGC and the SCM are together referred to as a "call server" (CS), 206. A call server provides the services interaction and controls the call state of a media gateway. The protocol used by the MGC portion of the call server to control the MG is called the media gateway control protocol (MGCP), for example, the so-called "Megaco" protocol. Megaco is an application layer protocol which is also described in ITU Recommendation H.248, which shares a common text with the Internet Engineering Task Force (IETF) Internet Draft "Megaco Protocol," and which is incorporated herein by reference. The "Megaco Protocol" was derived from an MGCP Internet Draft but was renamed "Megaco" and became an IETF working document in March, 1999. Throughout the rest of this disclosure we will refer to Megaco as "Megaco/H.248."

The architecture described above and shown in FIG. 2 has been widely published and accepted. However, it is still under development and has seen little deployment. There are still problems to be overcome before such networks can serve all users with the same features that such users have come to expect from the PSTN. One problem is that the Megaco/H.248 protocol provides limited signaling for control of customer premises equipment (CPE) functions. The protocol was designed to recognize only the basic functions of POTS telephones; yet there is a huge myriad of other types of programmable, digital and analog phones, as well as other devices, available and in use. In the PSTN, programmable phones rely on signals exchanged with the switch or some other type of central call control to implement lamps, function keys, screen displays, etc. In addition to standard programmable phones, such as ISDN and analog display services interface (ADSI) phones, there are many types of standard or manufacturer specific programmable phones that use or can use non-standard, manufacturer specific signaling to perform these functions. Some non-standard programmable phones are sometimes generically called "P-phones." Because there are a number of possible types of programmable phones, it is impossible to include signaling for all of them in Megaco/H.248. What is needed is a way for a call server or MGC to control these functions of a programmable phone without adding new, telephone specific signaling to the standard Megaco/H.248 protocol.

SUMMARY

The present invention solves the above-described problem by providing a signaling package for the Megaco/H.248 protocol which encapsulates or "tunnels" control and signaling codes for an endpoint device such as a programmable phone so that the codes can be communicated between a call server and the endpoint device. Only the call server and the endpoint device need have the intelligence to interpret and create the control and signaling codes. Throughout this disclosure, we refer to codes that signal events and communicate directions between the endpoint and the call server as "operating codes" or "opcodes," whereas we refer to messages between the MGC and the media gateway as "commands" or "messages."

A media gateway according to one embodiment of the invention receives commands from the call server including operating codes from the call server that are encapsulated within Megaco/H.248 commands sent by the MGC function within the call server to the media gateway. The media gateway de-encapsulates the operating codes and delivers them to the endpoint for use by a device connected to that endpoint. The media gateway can also encapsulate operating codes from the endpoint within a message and send the message to the call server. All commands and messages between the MGC and the media gateway follow the Megaco/H.248 protocol, and commands sent by the MGC to the media gateway are confirmed with a transaction reply message. In this way, the media gateway "tunnels" operating codes back and forth between the call server and an endpoint.

The call server according to one embodiment of the invention is provisioned to understand the operating codes for a telephone or other device on a given endpoint. The call server encapsulates operating codes within a Megaco/H.248 command and the call server sends the command to the media gateway to be forwarded to the endpoint. Only the opcodes get to the endpoint device. The MGC receives messages from the media gateway, the message having one or more operating codes from an endpoint device encapsulated within. The call server can de-encapsulate and understand these codes. The media gateway is unaware of the meaning of the operating codes; it simply passes them between the endpoint and the call server.

The invention can be implemented by software in combination with the hardware of the media gateway and call server media gateway controller. The software which implements many aspects of the present invention can be stored on a media. The media can be magnetic such as diskette, tape or fixed disk, or optical such as a CD-ROM. Additionally, the software can be supplied via a network. In one embodiment of the invention, the media gateway is essentially a switching system containing switching fabrics, a computing module, protocol stacks, applications, network interfaces, and other resources. The network interfaces are implemented by adapters which are connected to switching fabrics to allow access to the system from the networks. Input/output modules or adapters allow software to be loaded and various maintenance functions to be performed. A computing platform contains a processor and memory that execute the software and provide the means to control the operation of the media gateway to implement the invention.

In one embodiment a call server includes a media gateway controller (MGC) function to implement the Megaco/H.248 protocol, and a service control module (SCM). The SCM is typically a computing platform like that used in PSTN switching. The MGC and the SCM may be independent, may be combined, or may be different adapter cards within a frame. A separate MGC may be a type of network termination (NT) server containing a bus such a personal computer interconnect (PCI) bus. An NT server that typically implements the invention includes input/output devices and adapters for connection to the necessary networks. The server can include both hardware (a central processing unit and memory) and software which together provide the means to implement the media gateway controller.

DETAILED DESCRIPTION OF ONE OR MORE EMBODIMENTS

Figure 3:
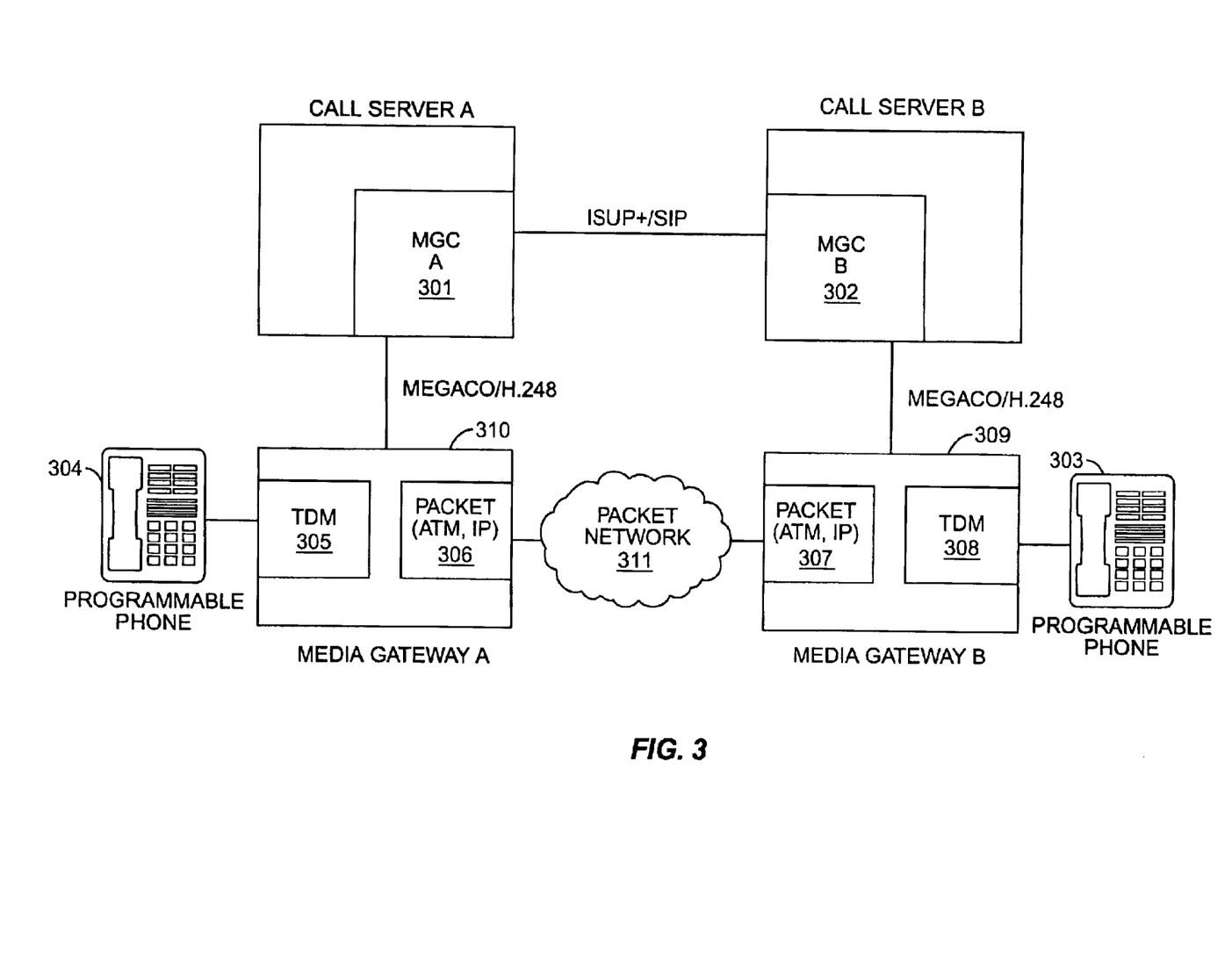
FIG. 3 is a network diagram that illustrates a network in which the present invention is being used.

The detailed examples discussed below illustrate how the invention works with a programmable phone connected to an end-point of a packet network. The invention operates in the same manner to tunnel opcodes to other devices that may be connected to an end-point, including devices, which interface to PSTN trunks. FIG. 3 illustrates one network architecture in which the present invention can be used. According to FIG. 3, programmable telephone 304 is where a call originates. Programmable telephone 303 is where a call terminates. Telephones 303 and 304 are shown directly connected to media gateways as illustrations only. In reality, they can be directly connected to the media gateways or can be connected through additional TDM devices. Media gateway A, 310, is the originating media gateway and media gateway B, 309 is the terminating media gateway. The media gateways of FIG. 3 convert voice to ATM. We therefore refer to this network architecture as voice and telephony over ATM, or "VTOA" architecture, however, the same architecture can be used for Internet protocol (IP) telephony or frame relay (FR). Call server A, including media gateway controller (MGC) 301, controls media gateway A. Call server B, including MGC 302, controls media gateway B. Alternatively both media gateways can be controlled by a single call server. Media gateway A includes TDM endpoint 305 and packet network interface 306. Media gateway B includes TDM endpoint 308 and packet network interface 307. Packet network 311 serves as the transport network through which bearer channels are established to interconnect calls between the two media gateways. This network and the interfaces to which it is connected can be frame relay, ATM, IP, or some other type of packet network. The media gateway controllers communicate with each other via any application layer control protocol. ISUP is one example of an application layer control protocol. As another example, session initiation protocol (SIP) as described in Internet Engineering Task Force (IETF) Request for Comments (RFC) 2543: Session Initiation Protocol, March, 1999, which is incorporated by reference, can also be used. It is also possible to use a nonstandard protocol, specific to the manufacturer of the call servers and media gateways. Which particular protocol is used for this connection is not important to the invention.

The media gateways in FIG. 3 are controlled using the Megaco/H.248 protocol. In one embodiment, each call server includes an MGC as shown in FIG. 3. However, we refer to any device or group of devices providing call control and programmable phone control through the media gateways as a call server. The Megaco/H.248 protocol assumes a separate MGC function within the call server. A call server that implements the invention may or may not have a separately identifiable MGC function. Also, the MGC function, if present, can be a software entity within the call server, a separate box, or an adapter card. The function of the invention does not depend on the precise implementation of the call server.

The connection model for the Megaco/H.248 protocol describes logical entities, or objects, within the media gateway that can be controlled by the media gateway controller. The model relies on extractions, primarily terminations and contexts. A termination sources and/or sinks one or more media streams. A context is an association between a collection of terminations. In general, an "add" command is used to add terminations to contexts. A termination may be moved from one context to another with a "move" command. A termination exists in, at most, one context at a time. A non-packet termination can exist outside of a context. Property values can be set for terminations by including appropriate descriptors as parameters to the various commands in the Megaco/H.248 protocol. A termination in a context may have its value changed by the "modify" command. Other commands and messages that are important to the implementation of the invention will be discussed later.

Figure 4:
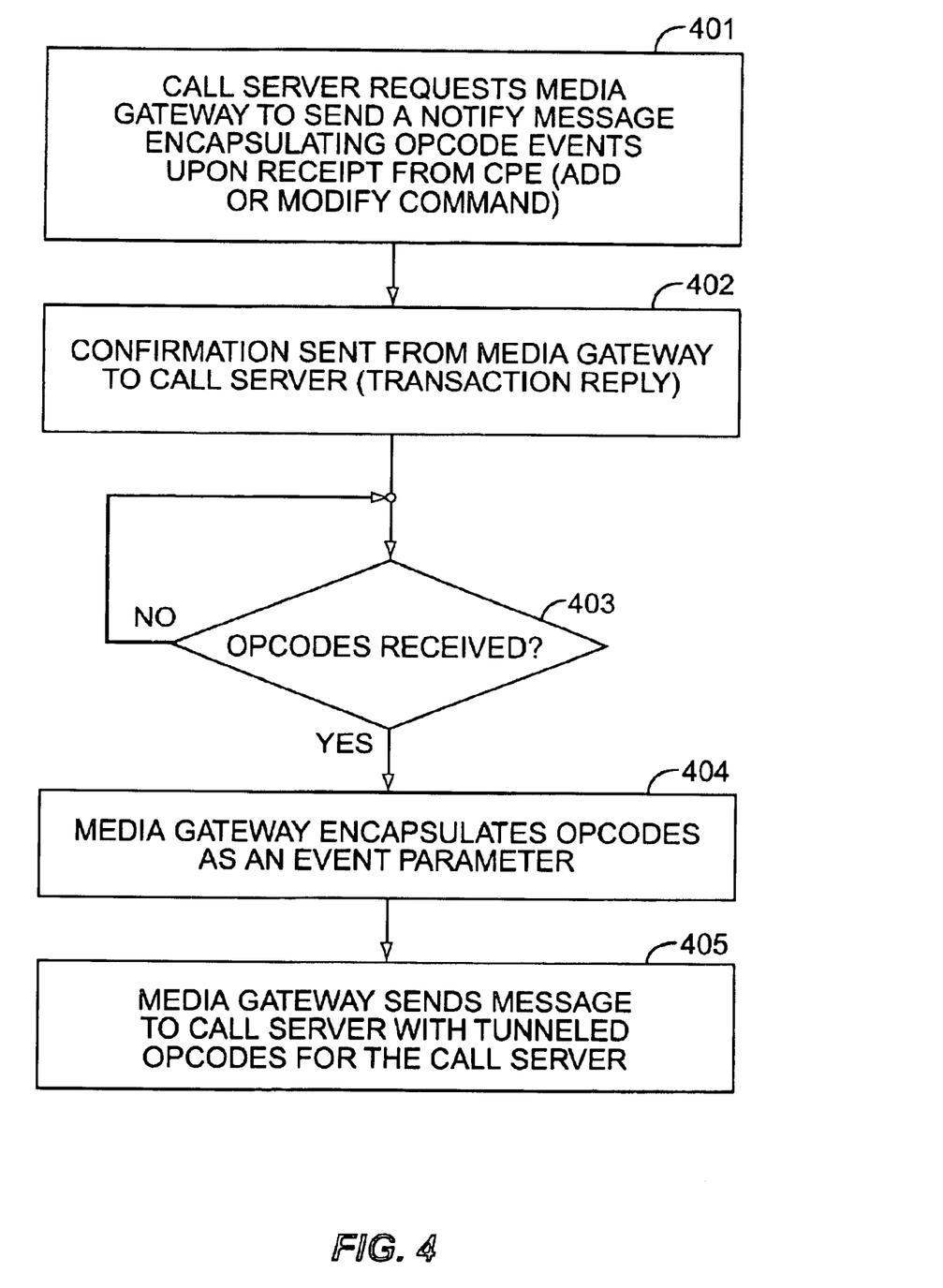
FIG. 4 is a flowchart illustrating the method of tunneling operating codes from the endpoint to the call server according to the invention.

FIG. 4 is a flowchart illustrating the method according to one embodiment of tunneling opcodes from the programmable endpoint device, such as a programmable phone, to the call server according to the invention. Since the call server controls the process, it must first send a command at step 401 to the media gateway requesting notification of the receipt of opcode events. The call server requests that a notify message be sent out by the media gateway when opcodes are detected. The notify message will have the op codes embedded. The command used to direct the media gateway to do this can be an add command or a modify command, depending on the status of the current telephone connection. This command is confirmed at step 402 by the media gateway sending a transaction reply message to the call server. At 403 the media gateway waits until it detects one or more opcodes coming from the CPE. These may be the result of, for example, a button being pressed. At 404 the media gateway encapsulates these opcodes in a Megaco/H.248 notify message as an event parameter and at step 405 the message is sent to the call server.

Figure 5:
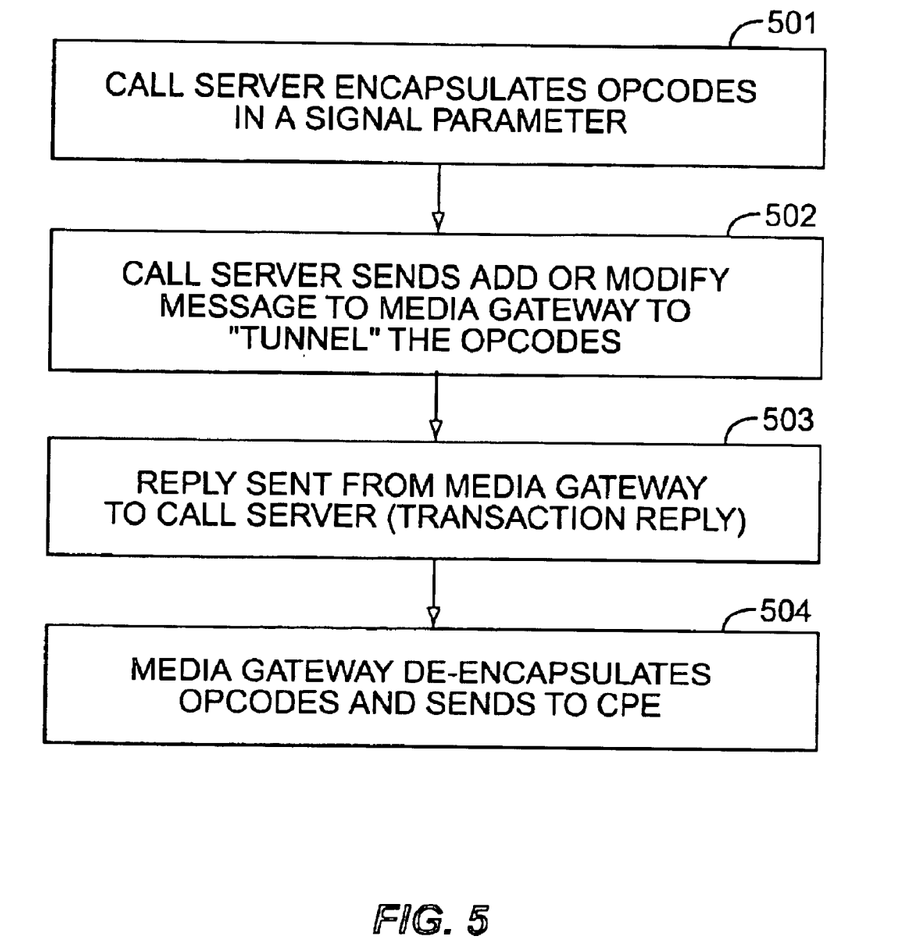
FIG. 5 is a flowchart illustrating the method of tunneling operating codes from the call server to the endpoint according to the invention.

FIG. 5 illustrates the process of sending one or more opcodes from the call server to the programmable phone according to one embodiment of the invention. At stop 501, the call server encapsulates the opcodes in a command. In one embodiment, the opcodes are encapsulated in a signal parameter of a modify command. At step 502, an add or a modify command is sent to the media gateway. The media gateway does not understand or act on the opcodes. It confirms the command with a transaction reply message at 503, de-encapsulates the opcodes, and forwards the opcodes to the CPE at step 504. In this way the media gateway "tunnels" the opcodes from the call server to the CPE.

Figure 6:
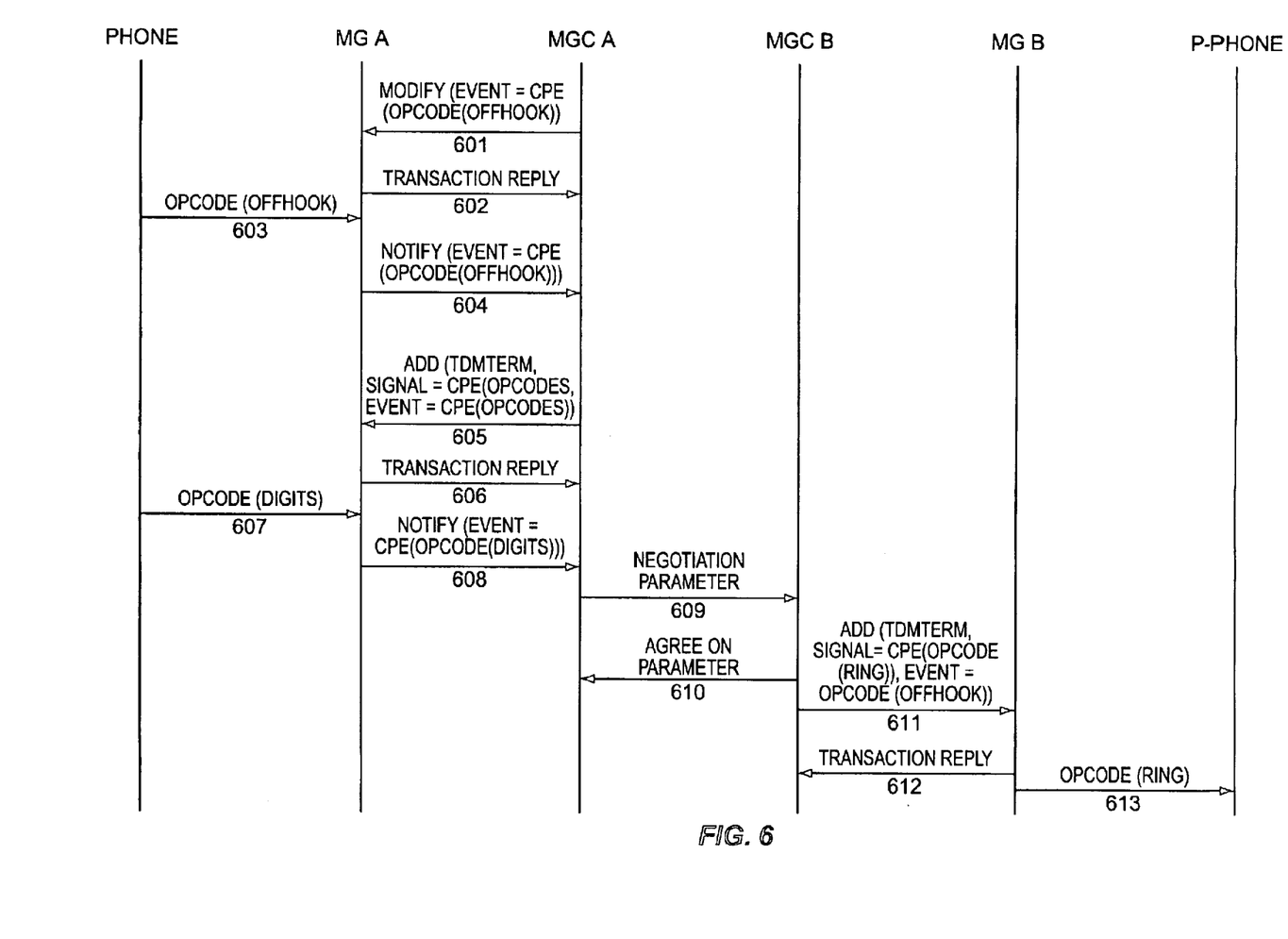
FIG. 6 shows an example message flow diagram for a network in which the invention is being used.

FIG. 6 illustrates more detail of the tunneling processing a showing specific message flow example according to one embodiment of the invention. By way of example, the call servers in this case include discrete media gateway controller (MGC) function. Also as an example, the programmable phones are so-called "P-phones" which use a manufacturer specific protocol. In FIG. 6, the P-phone on the left is connected to media gateway (MG) A which is controlled by call server/MGC A, and the P-phone on the right is connected to MG B which is controlled by call server/MGC B. The A side originates a call.

Each call server is aware of its programmable phone because it has been provisioned at the time the phone was connected according to a terminal number at the media gateway. Tunneling is then accomplished to the programmable telephone through a package, which is added to the Megaco/H.248 protocol according to the invention. Packages in the Megaco protocol are used to define a group of events supporting a particular functionality. Packages define properties, events, signals and statistics that may occur on terminations. A media gateway may support multiple packages depending on the functionality it provides. A tunneling package is added to the Megaco/H.248 protocol according to the invention. The package can be used for any programmable phone, including, but not limited to phones that use ISDN, ADSI, and other standards, as well as the P-phones already discussed. The package can also be used for other devices besides phones, including, but not limited to, trunk interfaces. Signals and events in the package are specified in Megaco/H.248 commands and messages as: "CPE (opcodes)" where characters occupying the space occupied by "CPE" designate the type of phone or other device. In the case of programmable phones, the opcodes are usually a group of one or more hexadecimal numbers, for example, some P-phones use a two-byte hexadecimal number. As another example, in the case of an ISDN phone these numbers are specified in the ITU Q.931 recommendation.

Returning to FIG. 6, call server A notifies media gateway A to provide an opcode event with modify command 601. The command is confirmed with transaction reply message 602. At 603, an opcode for going offhook is received by media gateway A due to a call being initiated by a user. At 604, the media gateway tunnels this opcode to the call server inside a notify command as an opcode event. The call server now knows that a call is being made and sends an add command to initiate a TDM termination at 605. A transaction reply, 606, is sent by media gateway A to confirm the receipt of the add command. At 607, opcodes that indicate digit buttons being pressed are detected by media gateway A. Another notify message, 608, is sent by the media gateway to tunnel the digit opcodes to the call server. It should be noted that, depending on the type of endpoint device, it might be necessary for the call server to generate tones, as some types of phones do not generate tones internally based on key presses. Tones may be desired for feedback to the caller, and they would be required to implement some calling card and audio text services that might be accessed from within the packet network.

In the example of FIG. 6, call parameters are negotiated between the call servers at the two ends of the call, as shown by the exchange of messages 609 and 610. This negotiation takes place through the use of ISUP+, SIP, or SIP+ messaging. At 611, an add command is sent by call server B to media gateway B. In this example, party B wishes to receive calls directly, and wishes to be notified of an incoming call by a telephone ring. The operating code that is tunneled to the telephone is an opcode that simply directs the phone to ring. The media gateway confirms the add command with a transaction reply, 612, and sends the ring opcode to its P-phone at 613. It should be noted that FIG. 6 is simply an example of part of a message flow. There can be other opcodes tunneled to and from each phone during a session, and many other message flow scenarios are possible.

Figure 7:
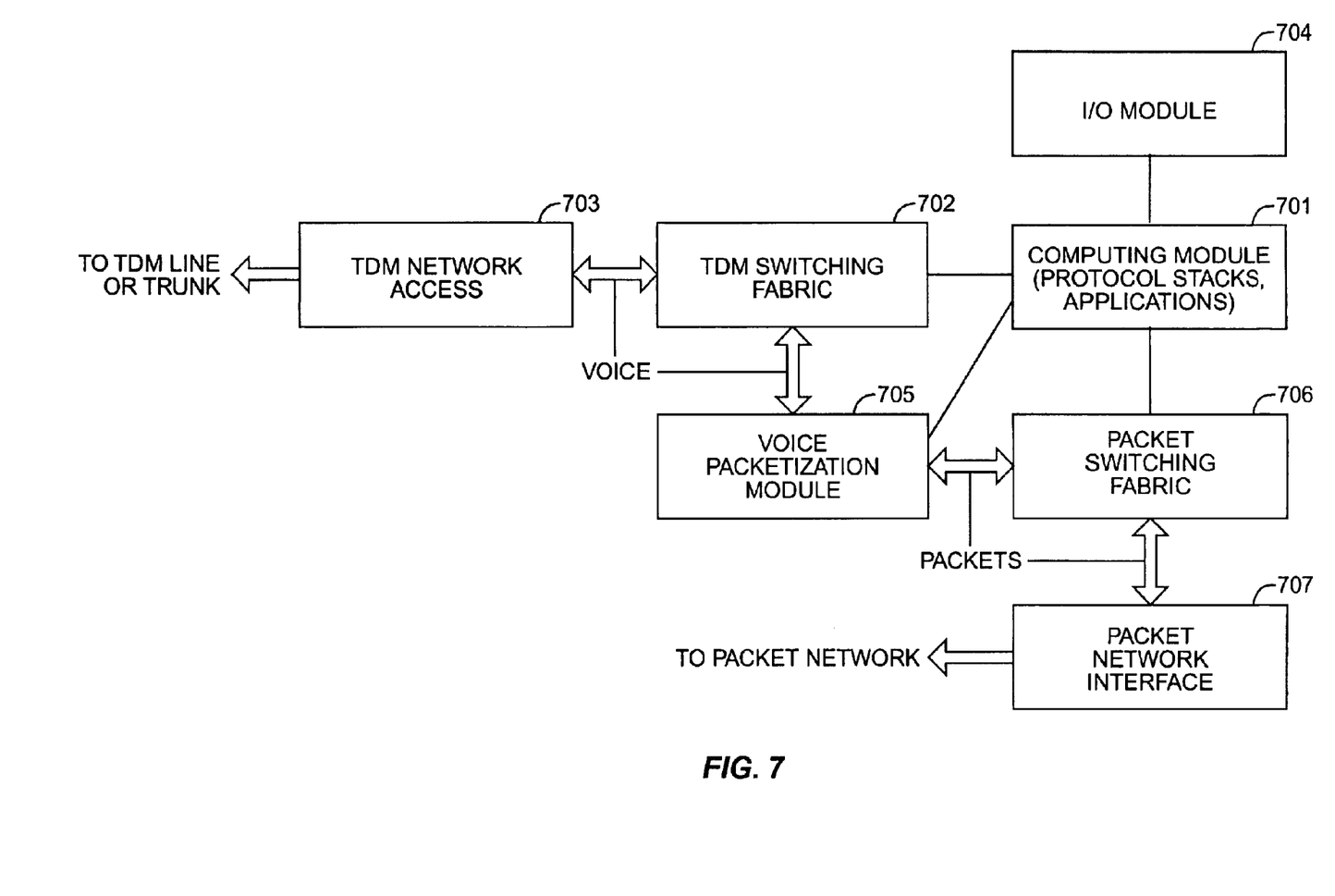
FIG. 7 shows a block diagram of a media gateway according to the present invention.

FIG. 7 illustrates a functional block diagram of a switching system, which can be used to implement a media gateway, which in turn implements some aspects of the invention. Computing module 701 includes a central processing unit, memory, and supporting circuitry. This computing module, together with computer program code (protocol stacks and applications) stored in the memory, is the means for controlling the overall operation of the switching system to perform the method of the invention according to one embodiment of the invention. TOM switching fabric 702 is for switching TOM channels and is controlled by the computing module. Input/output (I/O) module 704 is also connected to the processor of computing module 701 and includes media devices to load computer program code as well as connections for workstations or other equipment for control and maintenance of the switching system. TOM network access module 703 serves as a TOM network interface and is connected to TOM switching fabric 702, both of which are managed by the computing module 701. Voice packetization module 705 converts TDM voice to packets, such as ATM cells or FR/IP packets. Packet switching fabric 706 sends and receives packets on the packet network through packet network interface 707.

Figure 8:
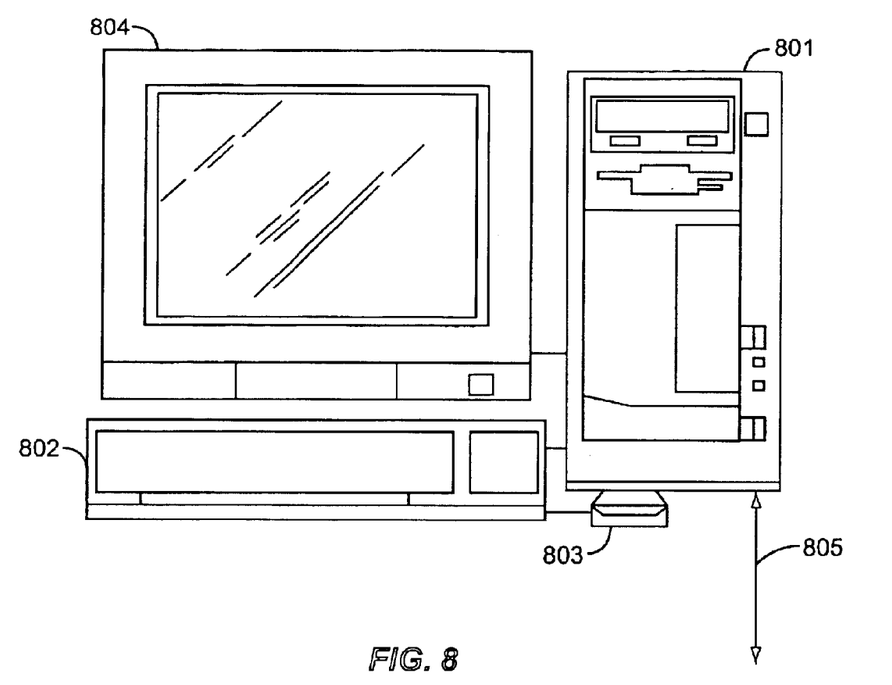
FIG. 8 illustrates a call server or MGC according to the invention.

FIG. 8 illustrates an network termination (NT) server, which is used to implement a media gateway controller and/or a call server according to the present invention. We use the acronym "NT" generically and do not intend to specify any particular operating system for the server. I/O devices such as keyboard 802, mouse 803 and display 804 are used to control the system. One or more of these devices may not be present in normal operation. System unit 801 is connected to all devices and contains memory, media devices, a central processing unit (CPU), and software, all of which together form the means to implement on or more aspects of the present invention. Network interfaces are normally implemented via adapter cards plugged into a bus, however, for the sake of simplicity they are shown graphically as interface 805. The NT server shown in FIG. 8 is shown as an example only. A call server and/or an MGC can be implemented on many types of platforms, including devices similar to the media gateway shown in FIG. 7.

Figure 9:
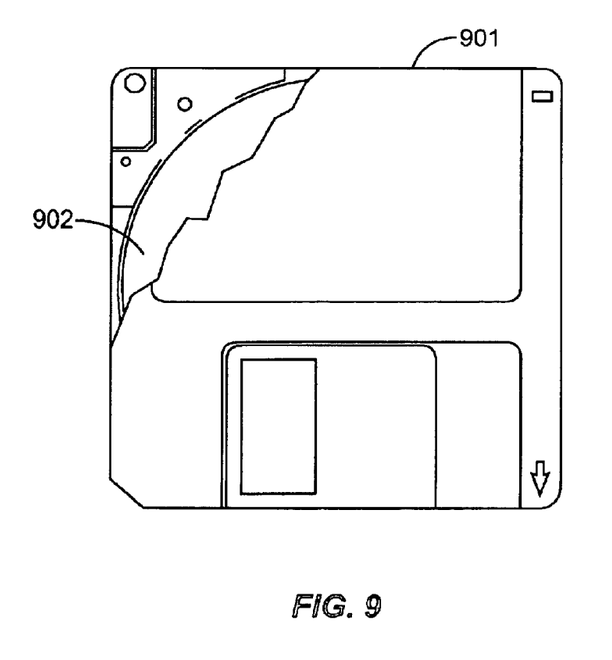
FIG. 9 illustrates a media on which computer program code that implements the invention is stored.

As previously mentioned, appropriate computer program code in combination with appropriate hardware implements most of the elements of the present invention. This computer program code is often stored on storage media. This media can be a diskette, hard disk, CD-ROM, DVD-ROM, or tape. The media can also be a memory storage device or collection of memory storage devices such as read-only memory (ROM) or random access memory (RAM). Additionally, the computer code can be transferred to the NT server over the Internet or some other type of network. FIG. 9 illustrates one example of a media. FIG. 9 shows a diskette of the type where magnetic media 902 is enclosed in a protective jacket 901. Magnetic field changes over the surface of the magnetic media 902 are used to encode the computer program code. In this way the computer program code is stored for later retrieval.

We have described specific embodiments of our invention, which provides a way to tunnel operating codes between a call server and a programmable telephone in a packet network. One of ordinary skill in the networking and computing arts will quickly recognize that the invention has other applications in other environments. In fact, many embodiments and implementations are possible. The following claims are in no way intended to limit the scope of the invention to the specific embodiments described.

We claim:

1. A method of tunneling operating codes received from an endpoint in a network to a call server, the method comprising the steps of:

receiving a command from the call server to notify the call server of the receipt of one or more operating codes from the endpoint;

confirming the command with the call server; and if and when the operating codes are received from the endpoint, encapsulating the operating codes within a message and sending the message to the call server.

2. The method of claim 1 wherein the message is a Megaco/H.248 notify message.

3. A method of tunneling operating codes received from a call server to an endpoint in a network, the method comprising the steps of:

receiving a command from the call server, the command including one or more operating codes encapsulated within;

confirming the command with the call server; and de-encapsulating the operating codes within the command and forwarding the operating codes to the endpoint.

4. The method of claim 3 wherein the command is formatted according to Megaco/H.248 protocol.

5. A method of receiving operating codes from an endpoint in a network, the method comprising the steps of:

sending a command to a media gateway to send a notification if and when one or more operating codes are received by the media gateway from the endpoint; and receiving a message from the media gateway, the message having the one or more operating codes encapsulated within.

6. The method of claim 5 wherein the message is a Megaco/H.248 notify message.

7. A method of sending operating codes to an endpoint in a network, the method comprising the steps of:

encapsulating one or more operating codes within a command; and sending the command to a media gateway to be forwarded to the endpoint so that the operating codes are tunneled to the endpoint.

8. The method of claim 7 wherein the command is formatted according to Megaco/H.248 protocol and a confirmation of the command is received from the media gateway.

9. A computer program product for enabling a media gateway to tunnel operating codes between a call server and an endpoint in a network, the computer program product having a media with a computer program embodied thereon, the computer program comprising:

instructions for receiving commands from the call server, at least some commands including one or more operating codes from the all server encapsulated within;

instructions for de-encapsulating the operating codes from the call server;

instructions for confirming commands with the call server; and instructions for encapsulating one or more operating codes from the endpoint within a message and sending the message to the call server.

10. The computer program product of claim 9 wherein the commands and the message are formatted according to Megaco/H.248 protocol.

11. A computer program product for enabling a call server to exchange operating codes with an endpoint at a media gateway, the computer program product having a media with a computer program embodied thereon, the computer program comprising:

instructions for encapsulating one or more operating codes from the call server within a command and sending the command to the media gateway to be forwarded to the endpoint; and instructions for receiving a message from the media gateway, the message having one or more operating codes from the endpoint encapsulated within.

12. The computer program product of claim 11 wherein the command and the message are formatted according to Megaco/H.248 protocol.

13. Apparatus for tunneling operating codes between a call server and a network endpoint, the apparatus comprising:

means for receiving commands from the call server, at least some commands including one or more operating codes from the call server encapsulated within;

means for de-encapsulating the operating codes from the call server;

means for confirming commands with the call server; and means for encapsulating one or more operating codes from the endpoint within a message and sending the message to the call server.

14. Apparatus for controlling an endpoint device connected to a media gateway by exchanging operating codes with the device, the apparatus comprising:

means for encapsulating one or more operating codes from the apparatus within a command and sending the command to the media gateway to be forwarded to the device; and means for receiving a message from the media gateway, the message having one or more operating codes from the device encapsulated within.

15. A media gateway comprising:

a switching fabric;

one or more network interfaces connected to the switching fabric; and a computing module connected to the switching fabric for controlling the switching fabric to de-encapsulate operating codes from the call server to tunnel the operating codes from the call server to an endpoint, and encapsulate one or more operating codes from the endpoint to tunnel the operating codes from the endpoint to the call server.

16. The media gateway of claim 15 wherein the command and the message are formatted according to Megaco/H.248 protocol.

17. A programmed computer system having connections for at least one media gateway, the programmed computer system including a computer program comprising:

computer program code for encapsulating one or more operating codes from the computer system within a command and sending the command to the media gateway to be forwarded to a network endpoint; and computer program code for receiving a message from the media gateway, the message having one or more operating codes from the endpoint encapsulated within.

18. The computer system of claim 17 wherein the command and the message are formatted according to Megaco/H.248 protocol.

19. A system for controlling a device connected to an endpoint at a media gateway by exchanging operating codes with the endpoint, the system comprising:

a call server operable to send operating codes to the endpoint encapsulated in commands and to receive operating codes from the endpoint encapsulated in messages; and a media gateway connected to the call server operable to tunnel operating codes from the call server to the device and from the device to the call server.

20. The system of claim 19 wherein the commands and the messages are formatted according to Megaco/H.248 protocol.

21. The system of claim 19 wherein the call server further comprises a service control module and a media gateway controller.

22. The system of claim 20 wherein the call server further comprises a service control module and a media gateway controller.

* * * * *